US010452435B2

United States Patent
Novak et al.

(10) Patent No.: US 10,452,435 B2
(45) Date of Patent: Oct. 22, 2019

(54) DYNAMIC BUILD PIPELINE EXECUTION

(71) Applicant: ENTIT Software LLC, Sunnyvale, CA (US)

(72) Inventors: Miroslav Novak, Prague (CZ); Noam Kachko, Yehud (IL); Adi Godkin, Yehud (IL); Liran Levy, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/752,044

(22) PCT Filed: Aug. 14, 2015

(86) PCT No.: PCT/US2015/045378
§ 371 (c)(1),
(2) Date: Feb. 12, 2018

(87) PCT Pub. No.: WO2017/030542
PCT Pub. Date: Feb. 23, 2017

(65) Prior Publication Data
US 2018/0239639 A1    Aug. 23, 2018

(51) Int. Cl.
*G06F 9/44*    (2018.01)
*G06F 9/48*    (2006.01)

(52) U.S. Cl.
CPC .................. *G06F 9/4881* (2013.01)

(58) Field of Classification Search
CPC ..... G06F 8/34; G06F 8/30; G06F 8/20; G06F 8/71; G06F 8/36
USPC ........................................................ 717/106
See application file for complete search history.

(56) References Cited

U.S. PATENT DOCUMENTS

| | | |
|---|---|---|
| 2009/0271762 A1* | 10/2009 | Taylor ................. G06F 21/6227 717/107 |
| 2011/0004867 A1 | 1/2011 | Holden |
| 2013/0139127 A1 | 5/2013 | Vecera |
| 2013/0152047 A1 | 6/2013 | Moorthi et al. |
| 2014/0089896 A1 | 3/2014 | Mansour et al. |
| 2015/0026121 A1 | 1/2015 | Shani |

(Continued)

FOREIGN PATENT DOCUMENTS

| | | |
|---|---|---|
| WO | WO-2014027990 A1 | 2/2014 |
| WO | WO2014027990 A1 | 2/2014 |
| WO | WO-2015112170 | 7/2015 |

OTHER PUBLICATIONS

Heroku Dev Center, "Introduction to Heroku for Java Developers," (Research Paper), Dec. 23, 2014, 6 pages.

(Continued)

*Primary Examiner* — Chuck O Kendall

(57) ABSTRACT

According to an example, dynamic build pipeline execution may include extracting a pipeline flow related to build jobs, and generating, by using the extracted pipeline flow, a pipeline model that includes a plurality of pipelines related to the pipeline flow. Each pipeline of the plurality of pipelines may represent a set of related build jobs, and include an entry point to access the set of related build jobs. Dynamic build pipeline execution may further include generating another model related to the pipeline model to execute a build job of the set of related build jobs for a pipeline of the plurality of pipelines based on a parameter specified for the another model.

15 Claims, 8 Drawing Sheets

(56) References Cited

U.S. PATENT DOCUMENTS

2015/0379426 A1* 12/2015 Steele .................... G06N 20/00
706/12

OTHER PUBLICATIONS

Huttermann, M., "Mastering Binaries with Hudson, Maven, Git, Artifactory, and Bintray," (Research Paper), May 2014, 7 pages.
International Searching Authority., International Search Report and Written Opinion dated May 3, 2016 for PCT Application No. PCT/US2015/045378 Filed Aug. 14, 2015 10 pages.
martinfowler.com, "Microservices," (Web Page), Mar. 25, 2014, 14 pages.

* cited by examiner

500

EXTRACT PIPELINE FLOW RELATED TO BUILD JOBS THAT ARE USED TO IMPLEMENT A SET OF MACHINE READABLE INSTRUCTIONS
502

GENERATE, BY USING THE EXTRACTED PIPELINE FLOW, A PIPELINE MODEL THAT INCLUDES A PLURALITY OF PIPELINES RELATED TO THE PIPELINE FLOW
504

GENERATE A DOMAIN MODEL RELATED TO THE PIPELINE MODEL TO EXECUTE A BUILD JOB OF THE SET OF RELATED BUILD JOBS FOR A PIPELINE OF THE PLURALITY OF PIPELINES BASED ON A PARAMETER SPECIFIED FOR THE DOMAIN MODEL
506

FIG. 5

DYNAMIC BUILD PIPELINE EXECUTION

BACKGROUND

With respect to machine readable instructions, continuous integration (CI) may be described as the practice of merging developer working copies of a set of machine readable instructions with a shared mainline several times a predetermined time period such as a day. Continuous deployment (CD) may be described as an approach in which valuable sets of machine readable instructions are produced in short cycles, where the sets of machine readable instructions may be reliably released at any time. With respect to CI/CD, build servers that are used to implement CI/CD may influence efficiency of development teams as well as entire development organizations.

BRIEF DESCRIPTION OF DRAWINGS

Features of the present disclosure are illustrated by way of example and not limited in the following figure(s), in which like numerals indicate like elements, in which:

FIG. 5 illustrates a flowchart of a method for dynamic build pipeline execution, according to an example of the present disclosure;

DETAILED DESCRIPTION

Figure 1:
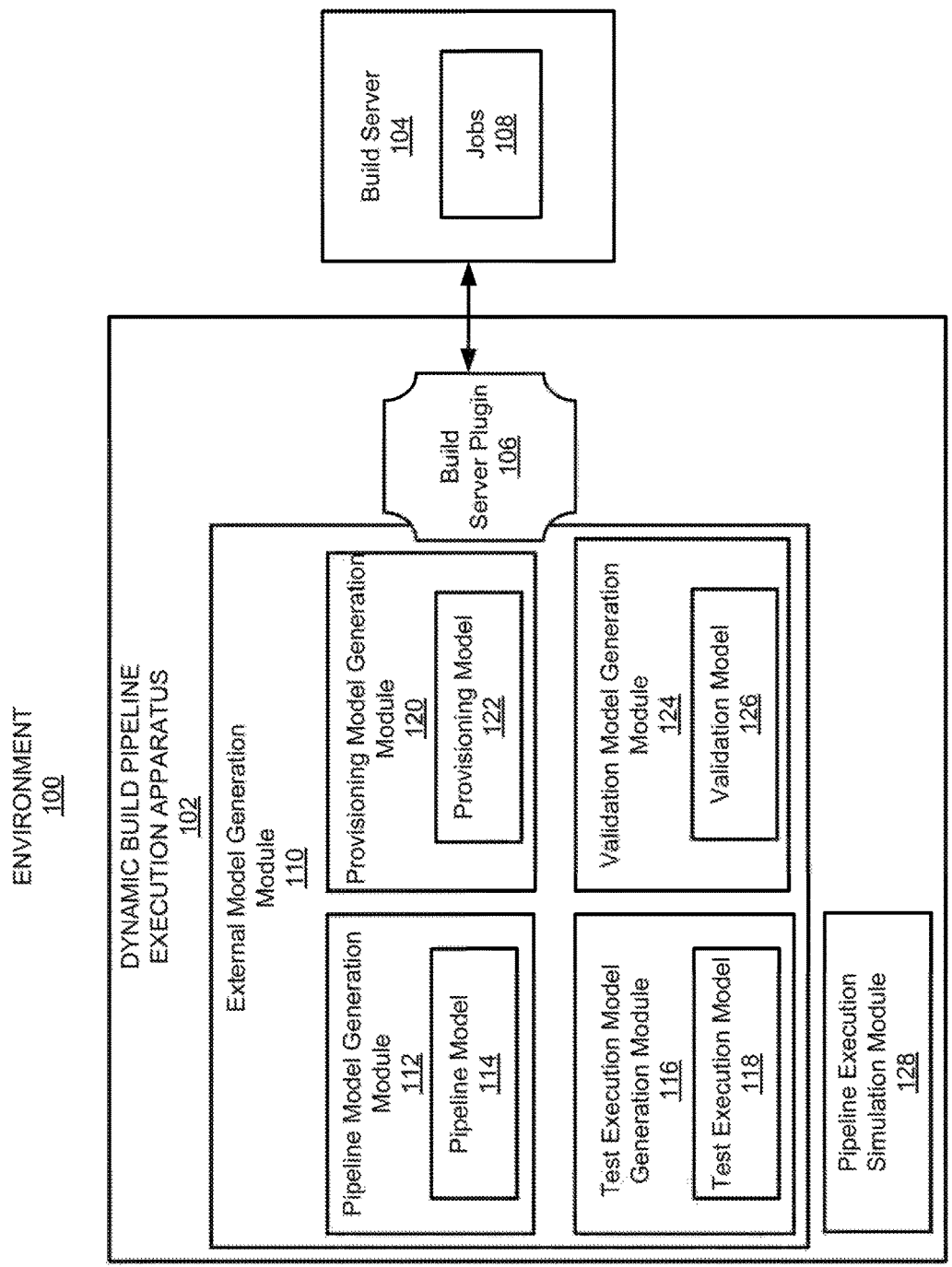
FIG. 1 illustrates an environment including a dynamic build pipeline execution apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to CI/CD, a build server that is used to implement CI/CD may be used to implement a variety of pipeline flows by using build jobs (i.e., data processing elements) that may include scripting and if-then-else types of machine readable instructions. In this regard, a build pipeline may be described as a set of build jobs connected in series, where the output of one build job is the input of the next build job. According to an example, the build jobs may be implemented on a build server, or on a set of build servers. The build jobs may also correspond to pipeline steps on a build server, or on a set of build servers. Build pipelines associated with the build jobs may include a variety of capabilities (e.g., assembly, machine readable instructions verification, testing, deployment, etc.). However, there are limits to the functionality which may be implemented, and provided at a build server.

In order to address the aforementioned technical challenges, a dynamic build pipeline execution apparatus and a method for dynamic build pipeline execution are disclosed herein. According to examples, the apparatus and method disclosed herein may provide for the externalization (e.g., by extraction) of a pipeline flow, higher-level modeling of pipeline flows and capabilities, and offering of pipeline flows and capabilities as services.

With respect to externalization of a pipeline flow, the apparatus and method disclosed herein may provide for the preparation of a specific flow based on a request (e.g., by a user), where the specific flow may be based on jobs implemented by a build server. In this regard, the specific flow that is prepared may be executed, and a build server plugin as disclosed herein may perform course-corrections and provide for the specific flow to match the request.

With respect to higher-level modeling of pipeline flows and capabilities, the apparatus and method disclosed herein may provide for execution of specific jobs based on pipelines, pipeline steps, and domain models. In this regard, after discovery, pipeline steps and build jobs may include a one-to-one correspondence. However, based on the domain models generated by the apparatus and method disclosed herein, the pipeline steps may be collapsed (i.e., grouped) in a reduced number of steps or a single step, with a step potentially including multiple jobs.

For the apparatus and method disclosed herein, without any changes in the pipeline implementation, a user may use various capabilities of the pipelines and execute the pipeline in different (e.g., custom) flows. A custom flow may be described as a flow including a subset of jobs which are needed to fulfill a request.

According to examples, the apparatus and method disclosed herein may provide for additional alternative flows of a pipeline to expose additional pipeline functionality. In this regard, the apparatus and method disclosed herein may provide for maintainability of complex pipelines, in that, as a pipeline grows, new features may be added as needed.

According to examples, the apparatus and method disclosed herein may provide for exposing of the capabilities of pipelines in a controlled manner (e.g., when a new feature such "selective test execution" or "provisioning of a certain environment" is needed).

According to examples, the apparatus and method disclosed herein may provide for modification of a pipeline flow. For example, a pipeline flow may be changed to bypass unit testing to validate new changes in a set of machine readable instructions with integration tests, without the need to "hardcode" such changes, for example, in the build jobs themselves. In this regard, instead of the need to modify the pipeline of the build jobs at the build server, a pipeline model (or a plurality of pipeline models) may be extracted from the pipeline of the build jobs at the build server, and a user may define a flow related to testing, provisioning, and/or validation of the build jobs in the defined flow and/or the entire defined flow.

According to examples, the apparatus and method disclosed herein may provide for externalization of flow definitions out of the build job implementations.

According to examples, the apparatus and method disclosed herein may provide for higher-level abstractions (e.g., with respect to testing, provisioning, validation, etc., as disclosed herein) to provide for the definition of alternative flows with minimal changes in a current implementation.

According to examples, the apparatus and method disclosed herein may provide for domain specific interfaces to be defined for pipeline steps and expose the domain specific interfaces as services, for example, by exposing certain capabilities as a service (e.g., selective test execution, deployment/provisioning, etc.). With respect to domain specific interfaces, the build server as disclosed herein may include build jobs and an action to execute the build jobs. In this regard, the apparatus and method disclosed herein may provide for a domain specific interface with various actions and parameters (e.g., test execution (which tests to run, which testing environment is needed, and which test parameters to pass, etc.)).

According to examples, the apparatus and method disclosed herein may provide for the generation of domain models that include a text execution model, a provisioning (i.e., deployment) model, and a validation model.

According to examples, the apparatus and method disclosed herein may provide for pipeline models and associated domain models which may be used to define which flows and which capabilities will be exposed to end users without hard-coding the flows and capabilities to the pipeline implementations.

According to examples, the apparatus and method disclosed herein may provide for pipeline models and associated domain models which allow users (e.g., developers) to request specific flow runs in a self-service mode. With the correct level of granularity, a user may understand which alternatives were exposed, choose the desired flow, and trigger the execution of the desired flow.

According to examples, the apparatus and method disclosed herein may provide for execution of a customized pipeline by specifying pipeline steps to execute or bypass. In this regard, the full pipeline flow may be determined, and the minimal set of build jobs fulfilling the request may be executed.

According to examples, the apparatus and method disclosed herein may provide for the requesting of execution of a certain capability with specific parameters. For example, a user may request execution of certain tests and/or provisioning of an environment and/or validation. The correct build jobs suitable for the execution may be located, and the full flow respecting pipeline dependencies may be determined and executed.

Figure 2:
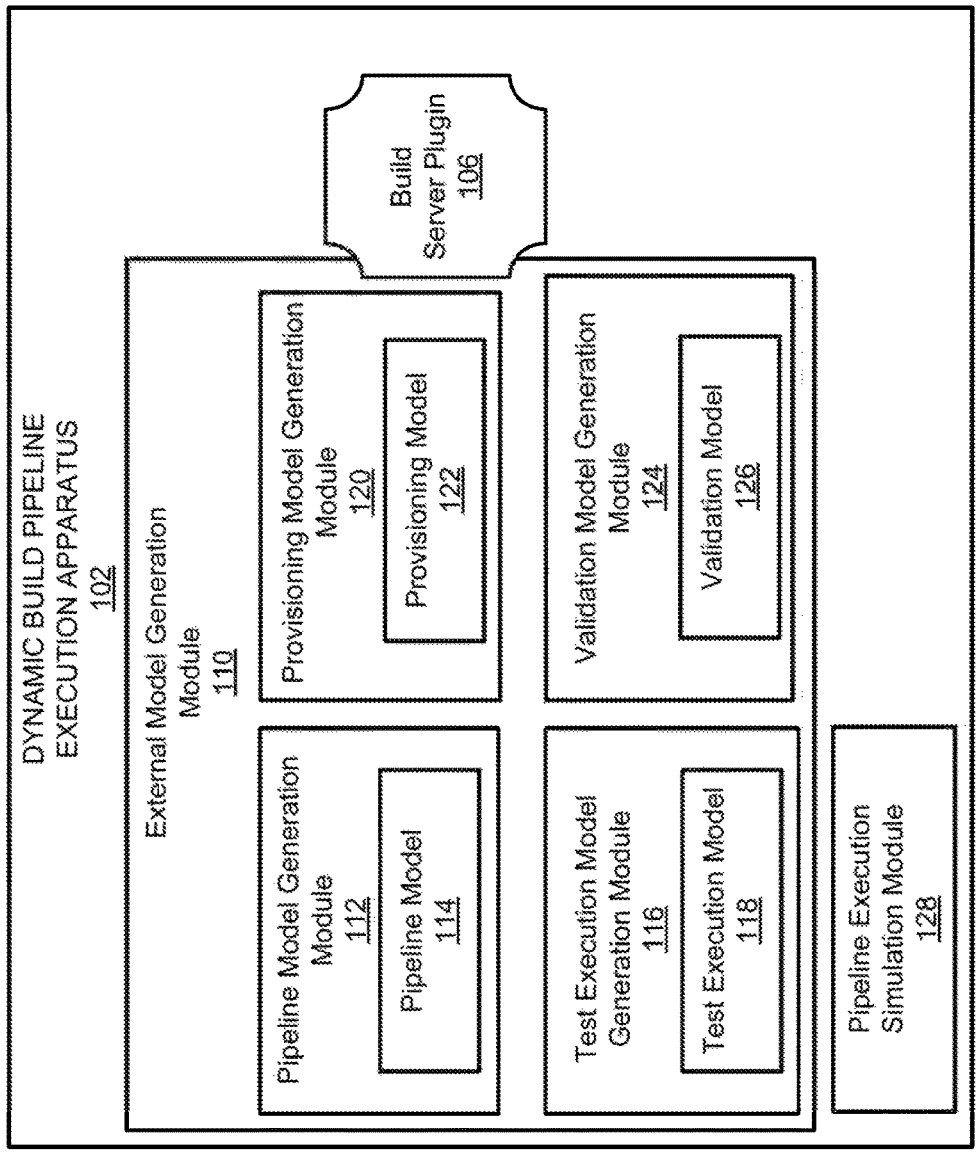
FIG. 2 illustrates an architecture of the dynamic build pipeline execution apparatus of FIG. 1, according to an example of the present disclosure.

FIG. 1 illustrates an environment 100 including a dynamic build pipeline execution apparatus (hereinafter also referred to as "apparatus 102"), according to an example of the present disclosure. FIG. 2 illustrates an architecture of the apparatus 102, according to an example of the present disclosure.

Figure 3:
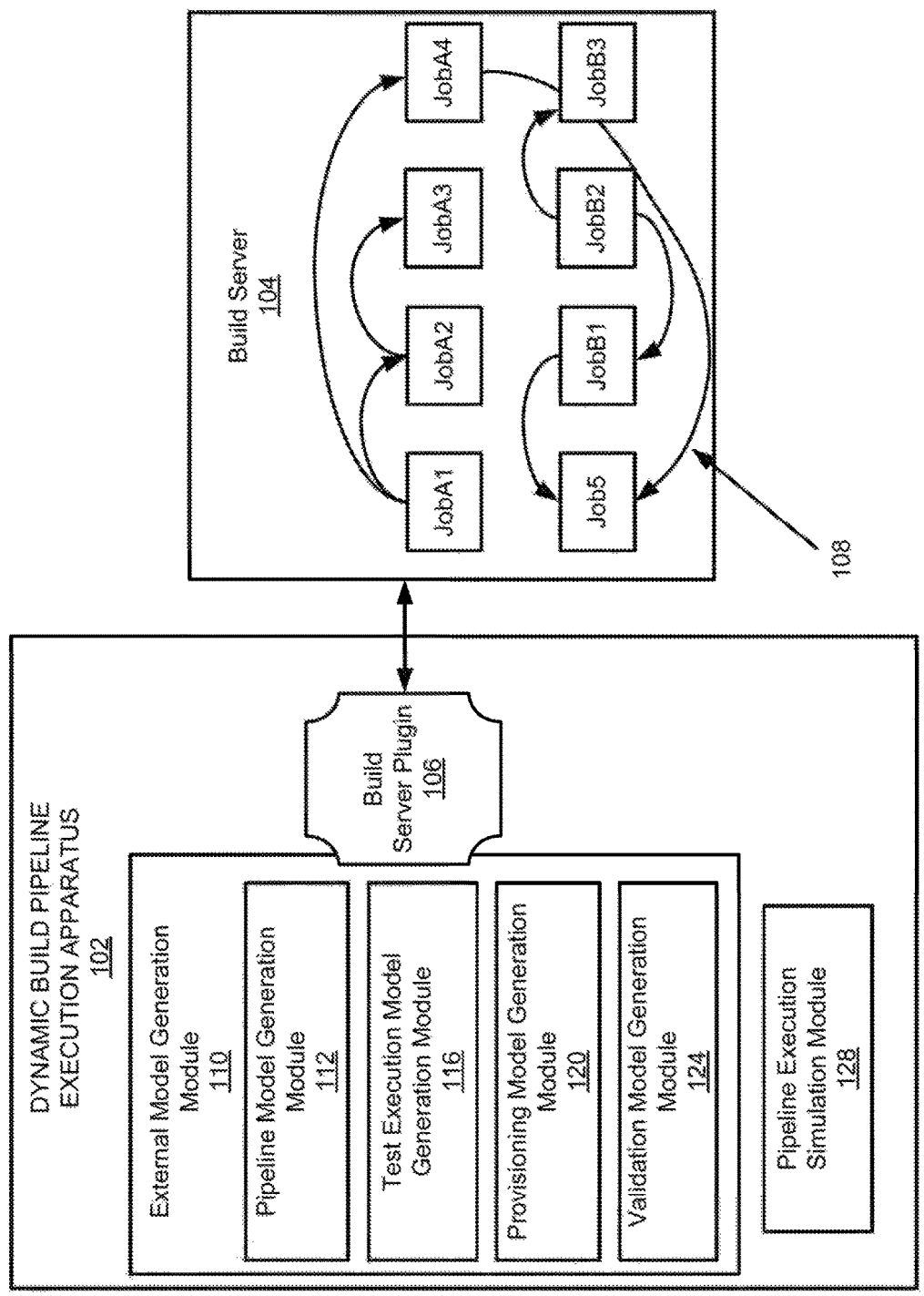
FIG. 3 illustrates a build server including a plurality of jobs, according to an example of the present disclosure.

Referring to FIGS. 1 and 2, the environment 100 is depicted as including a build server 104 that is operatively connected to the apparatus 102 by a build server plugin 106. The build server plugin 106 may extract information about the flow related to build jobs 108 (hereinafter referred to as "jobs 108"). For example, as shown in FIG. 3, the jobs 108 may be designated as JobA1, JobA2, JobA3, JobA4, Job5, JobB1, JobB2, and JobB3. Generally, the jobs 108 may be designated as JobA(1) to JobA(N), JobB(1) to JobB(N), etc.

The build server plugin 106 may intercept pipeline execution, and provide for the modification of flow execution based on an external definition specified by an external model generation module 110. The build server plugin 106 may discover the structure of pipelines at the build server 104, and track pipeline execution. In this regard, the build server plugin 106 may discover the structure of a plurality of pipelines (e.g., Pipeline-A and Pipeline-B for the example of FIG. 4 as disclosed herein) from the jobs 108, where a job of the jobs 108 may be performed in one or a plurality of the extracted pipelines. The build server plugin 106 may intercept and modify a build queue based on the state of the model maintained by a server side implementation as disclosed herein. For example, the build queue may be used to specify an execution order of the jobs 108 in the build server 104. In this regard, the build server plugin 106 may intercept and modify the build queue, for example, by removing jobs from the build queue, based on the state of the model maintained by the server side implementation.

With respect to server side implementation, the external model generation module 110 may hold configurations, model pipelines, and collect information about pipeline execution flows. With respect to configurations, the external model generation module 110 may store configurations for pipelines, pipeline steps (e.g., implemented by build jobs), and domain models as disclosed herein. With respect to pipeline step configurations (e.g., a build job may include a plurality of configurations for each pipeline in which the build job is used), the pipeline step configuration may include a classification of the purpose of a job (e.g., test, deployment, packaging, compiling, and generally, what is done by the job). Additionally, the pipeline step configuration may include test and run attributes (i.e., additional information about tests executed by the job (e.g., type of test, framework, environment, etc.)). The pipeline configuration may include the name of the pipeline, linked release (e.g., release in which the pipeline is used so that development activity, testing, etc., occurring in the pipeline is relevant for the linked release), and entry points.

The external model generation module 110 may determine an execution plan for the pipelines. Based on execution requests and models as disclosed herein, the external model generation module 110 may determine which steps (i.e., jobs) are needed to fulfill a request. When a plan is determined, the plan may be sent to the build server plugin 106. With this information from the external model generation module 110, the build server plugin 106 may change the flow of pipelines and bypass or execute certain steps.

Referring to FIGS. 1 and 2, a pipeline model generation module 112 of the external model generation module 110 may generate a pipeline model 114 to model pipelines based on structural information discovered from the build server 104 by the build server plugin 106. The pipeline model 114 may include pipeline steps (i.e., jobs) connected according to a pipeline structure and their dependencies. Structural dependencies (e.g., links between jobs) and heuristically detected dependencies (e.g., dependencies based on parameters, input/output between jobs, etc.) may be automatically (i.e., without human intervention) added to the pipeline model 114. The pipeline model 114 may be further extended, for example, by defining entry points, mandatory/non-mandatory steps, and dependencies.

With respect to automatic pipeline discovery, the pipeline model generation module 112 may detect, for example, source code (i.e., machine readable instructions) manipulation, machine readable instructions checking, compilation/assembly, deployment, and/or testing related to the jobs 108.

In this regard, the pipeline model generation module 112 may detect the aforementioned types of jobs (e.g., source code (i.e., machine readable instructions) manipulation, machine readable instructions checking, etc.) for pipeline discovery.

In addition to dependencies defined by the structure of pipelines, the pipeline model generation module 112 may add additional dependencies based on heuristic rules. For example, the pipeline model generation module 112 may add additional dependencies between source code manipulation steps and code checking and compilation steps that follow in the pipeline flow, compilation and testing, compilation and deployment, deployment and testing, etc.

The pipeline model generation module 112 may identify valid entry points (e.g., where a pipeline should be accessed, for example, for testing, deployment, etc.) to pipelines. Each pipeline may include one or multiple entry points with defined parameters, where the values of the parameters may be restricted with respect to testing, provisioning, and/or validation related to a pipeline. Examples of parameters related to testing may include test inputs, test environments, etc. Examples of parameters related to provisioning may include definitions related to provisioning groups, name of provisioning groups (e.g., QA1 provisioning), link to environments (e.g., AUT: QA1), link to related releases (e.g., release 2.2), jobs in a provisioning group (e.g., jobs 1-5), parameters of a provisioning group that are passed to jobs (e.g., cluster size: 3, load balancer: 192.100.100.100, DB server: 192.100.100.101, shared file repository: \\central\shared-store), etc. Examples of parameters related to validation may include a validation flow name (e.g., full regression test suite), a validation flow link to related release (e.g., release 2.2), parameters of the validation flow passed to jobs of the validation flow (e.g., suite-name: regression, code-profile: strict, packaging: standard), validation flow link to pipeline steps of pipelines where validation flow is used (e.g., pipeline A→job5-checkout), validation flow which is executed, ordered set of jobs to be executed (e.g., job6-prep, job7-assure-code, job8-check-code, jobX-package, jobY-deploy, jobZ-assure-dataset, jobII-run-tests, etc.), etc.

Referring to FIGS. 1 and 2, a test execution model generation module 116 of the external model generation module 110 may generate a test execution model 118 to expose "test execution" capabilities of pipelines as a "selective test execution service". With respect to "test execution" capabilities, the test execution model generation module 116 may provide for execution of a set of tests with test parameters and parameters which define a test environment (e.g., CalculatorTest.Addition, test parameters (inputA=1, InputB=1), and environment parameters (run in Chrome browser on Windows 10)). The test execution model generation module 116 may also include a test execution interface to define an agreement between the server side implementation as disclosed herein, the build server plugin 106, and build jobs, to facilitate interaction of job implementers (e.g., users of the apparatus 102). Users of the apparatus 102 may use the build server plugin 106 to obtain information about tests to be executed, and to provide information about capabilities of a certain job (e.g., test framework users—JUnit, test runner use—FailSafe, etc.). That is, users of the apparatus 102 may provide information about capabilities of a certain job to specify a job as being associated with testing, provisioning, and/or validation. Alternatively, without the build server plugin 106, a user may use pre-defined build variables for ascertaining capabilities of a certain job to specify a job as being associated with testing, provisioning, and/or validation.

The test execution model 118 may track mapping between build jobs and particular tests. The test execution model 118 may persist information with respect to which tests execute in which job, and with respect to defined test capabilities of jobs. When a user requests execution of a test (or a plurality of tests), the test execution model 118 may evaluate the mapping, identify relevant jobs for the test (or the plurality of tests), and based on test capabilities, the test execution model 118 may convert a test request to a specific format and add requests for execution of the matching jobs to an execution plan.

The pipeline with the test execution model 118 may include additional parameters. The additional parameters may be used to define which tests to execute, test parameters, and additional files which may be injected to the pipeline execution. Tests and parameters may also be defined in a file, instead of being passed as parameters.

With respect to the test execution model 118, when performing a request related to testing, jobs capable of executing tests may be selected. When multiple jobs are applicable to a test, a user may select any of the jobs to execute a test. The test execution model 118 may select pipelines which include the jobs needed to execute tests, and the best entry points of the selected pipelines. When pipelines and entry points are known, all parameters may be specified to include tests to execute (e.g., based a user's selection, independent of pipelines, of jobs, etc.), parameters for the tests which may depend on a selected set of tests (e.g., for each test, there may be a set of parameters), and parameters for the execution jobs (e.g., known when pipelines, entry points, and jobs needed to execute tests are known).

Referring to FIGS. 1 and 2, a provisioning model generation module 120 of the external model generation module 110 may generate a provisioning model 122. The provisioning model 122 may also be described as a deployment model. With respect to the provisioning model 122, a pipeline may prepare an environment (e.g., a development environment, a quality assurance environment, a production environment, etc.) so that new components of an application may be tested in the provisioned environment. Similar to the test execution model 118, the provisioning model generation module 120 may include a provisioning interface and the provisioning model 122 for interaction between provisioning requests and associated build job implementations. A user of the apparatus 102 may mark a set of jobs as a provisioning group. For such a provisioning group, a parameter may be defined and specified when executing a pipeline, and may be available to the build job implementation when jobs are executed.

With respect to the provisioning model 122, provisioning groups may be associated with provisioning environments. A provisioning request may be expressed as environment requests or provisioning group requests, where provisioning groups may be translated to jobs (e.g., JobA4 for the example of FIG. 4, where JobA4 is associated with provisioning environment QA1 (quality assurance-1)), users may be requested to provide parameters, and pipeline execution may be triggered. The pipeline execution may be performed for needed jobs (i.e., jobs that are part of the provision group or dependencies), and pass parameters so that a job may perform specific provisioning.

Referring to FIGS. 1 and 2, a validation model generation module 124 of the external model generation module 110 may generate a validation model 126. The validation model 126 may provide for the implementation of validation capabilities of pipelines (e.g., code checking, for example, for failure, compilation, smoke testing, etc.). The validation model 126 may be used to define a validation flow similarly to defining requests for custom flow executions. The request for the validation model 126 may be persisted (i.e., the request may be processed at all times during execution of jobs of a particular pipeline model related to the validation model 126). Defined validation flows may be associated with the pipeline. A validation flow may be defined as needed, where the validation flow may be used all of the time and other flows may be disallowed.

When triggering a pipeline, a defined validation flow may be referenced to execute the pipeline in the defined manner. By changing validation flows, different validation capabilities may be exposed (e.g., marking a more strict validation flow as needed during a stabilization period).

With respect to the test execution model 118, the provisioning model 122, and the validation model 126, these models may generate different types of results as disclosed herein. For example, the test execution model 118 may generate results such as a status of a test (e.g., successful/failed), a test report related to the tests that are performed, and a collection of test results (e.g., a test in module "automation-testing" in package "com.xx.server" in class "SearchTest" implemented in method "negativeSearchTest" failed, failure reason (some text . . . ), duration: 10 miliseconds, in build step XYZ of pipeline ABC), etc. The provisioning model 122 may generate results such as a status of a provisioning (e.g., successful/failed), links to build an instance created when executing build jobs together with their status, etc. Further, the validation model 126 may generate results such as status of a validation (e.g., successful/failed), links to build an instance created when executing build jobs together with their status, etc.

Referring to FIGS. 1 and 2, a pipeline execution simulation module 128 may provide for the simulation of pipeline executions. A user may select an entry point, set parameters, and place a custom execution flow request. In this regard, the pipeline execution simulation module 128 may determine the full flow based on the models disclosed herein with respect to the external model generation module 110, and present the execution plan instead of executing the execution plan. In this manner, a user may gain full control about which flows will be exposed. When a certain flow is to be prohibited, the user may update the pipeline model 114 and review the effect of the change in another simulation.

FIG. 3 illustrates a build server including a plurality of jobs, according to an example of the present disclosure. Further, FIG. 4 illustrates a pipeline model and domain specific models for the apparatus 102, according to an example of the present disclosure.

Figure 4:
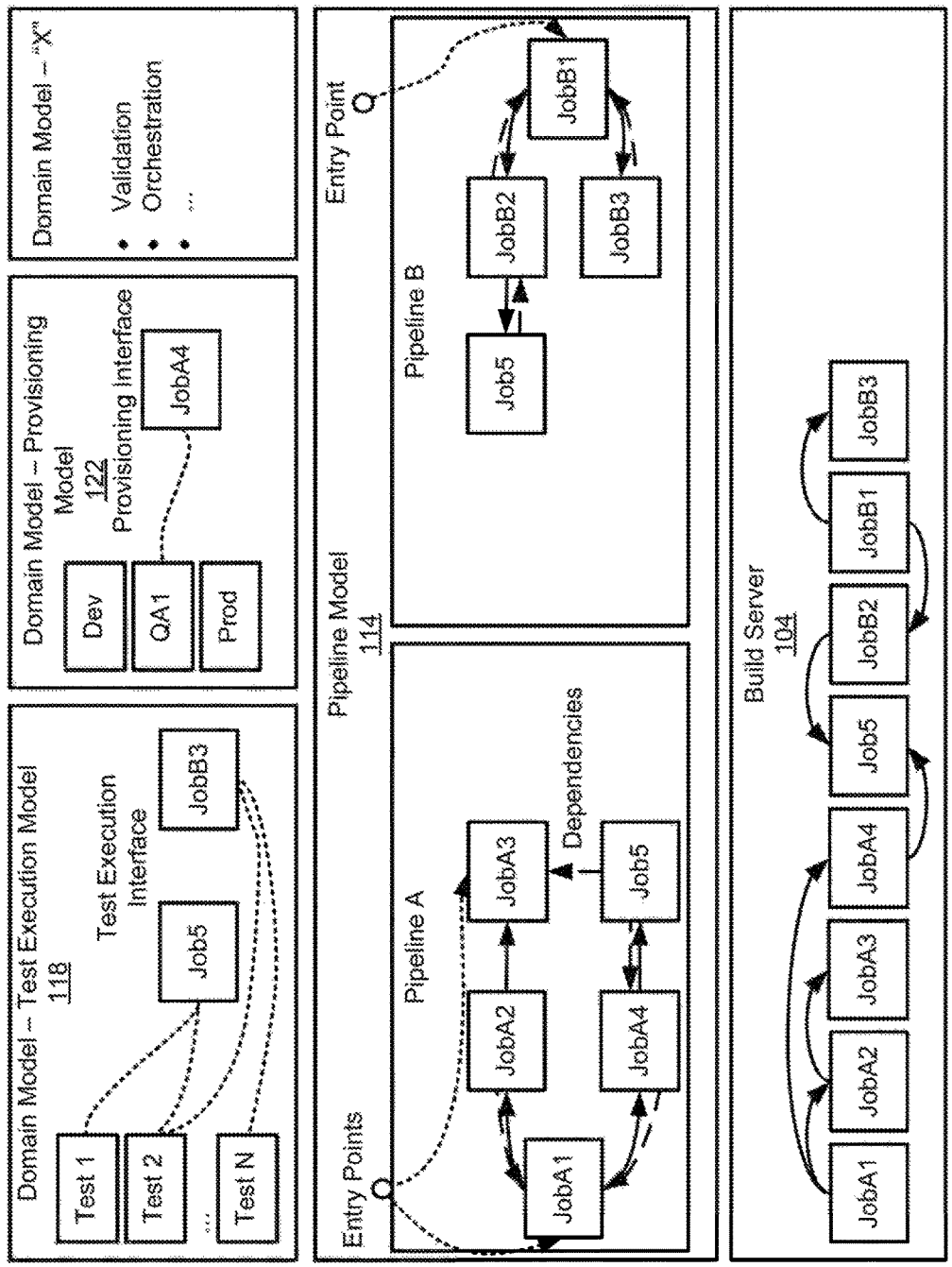
FIG. 4 illustrates a pipeline model and domain specific models for the dynamic build pipeline execution apparatus of FIG. 1, according to an example of the present disclosure.

Referring to FIGS. 3 and 4, the build server plugin 106 may extract information about the flow related to the jobs 108. For example, as shown in FIGS. 3 and 4, the jobs 108 may be designated as JobA1, JobA2, JobA3, JobA4, Job5, JobB1, JobB2, and JobB3.

Referring to FIG. 4, the test execution model 118 may include test executions related to Job5 and JobB3 of the jobs 108 for the example of FIGS. 3 and 4. In this regard, for the example of FIG. 4, Test-1, and Test-2 may be related to Job5, and Test-2 and Test-N may be related to JobB3.

As disclosed herein, with respect to externalization of a pipeline flow, the apparatus 102 may provide for the preparation of a specific flow based on a request (e.g., by a user), where the specific flow may be based on jobs implemented by the build server 104. In this regard, the specific flow that is prepared may be executed, and the build server plugin 106 may perform course-corrections and provide for the specific flow to match the request. For example, with respect to Test-1 and Test-2, Job5 is needed, with the entry point being through JobA1 (see Pipeline-A), and therefore JobA2 is not executed. Further, upon execution of Job5, JobA3 would also be executed based on the dependency connection to Job5. In a similar manner, if Test-2 is executed, JobB3 (and Job5) would also be executed, with the entry point being via execution of JobB1.

As disclosed herein, with respect to higher-level modeling of pipeline flows and capabilities, the apparatus 102 may provide for execution of specific jobs based on pipelines, pipeline steps, and domain models. In this regard, after discovery, pipeline steps and build jobs may include a one-to-one correspondence. However, pipeline steps may be collapsed (i.e., grouped) in a single step, with a step potentially including multiple jobs. Thus, a test request may be expressed as execution of a particular test (e.g., Test-1), instead of execution of all of the jobs related to a test.

The provisioning model 122 may include provisioning with respect to JobA4 of the jobs 108 for the example of FIGS. 3 and 4. As disclosed herein, a provisioning request may be expressed as environment requests or provisioning group requests, where provisioning groups may be translated to jobs (e.g., JobA4 for the example of FIG. 4, where JobA4 is associated with provisioning environment QA1 (quality assurance-1)), users may be requested to provide parameters, and pipeline execution may be triggered.

For the example of FIGS. 3 and 4, the pipeline model 114 may include pipeline-A and pipeline-B. Pipeline-A may include a JobA1, JobA2, JobA3, JobA4, and Job5, with two entry points via Job A1 and Job A3. Further, pipeline-B may include a Job5, JobB1, JobB2, and JobB3, with an entry point via JobB1.

Referring to FIGS. 1-4, the apparatus 102 disclosed herein may provide for the implementation of various scenarios with respect to dynamic build pipeline execution.

According to an example, assuming that a user (e.g., a developer) has fixed an issue in a set of machine readable instructions discovered by unit tests, and would like to bypass unit testing tests and validation of changes with integration tests, the apparatus 102 may provide for the understanding of the presented abstractions (e.g., pipeline structure, steps, and dependencies), for example, by generating the test execution model 118. The apparatus 102 may also provide for the selection of which jobs are to be executed and bypassed. Further, the apparatus 102 may determine the correct execution flow (e.g., by taking into consideration pipeline structure and dependencies), and execute the appropriate jobs. Thus, for the user that has fixed the issue in the set of machine readable instructions discovered by unit tests, the user may bypass the need to request implementation of the changes in the existing pipeline (e.g., by CI/CD personnel). Further, the user may bypass the need, for example, by CI/CD personnel, to capture every possible flow in the pipeline implementation.

According to an example, assuming that a user (e.g., a quality engineer) is to execute a suite of functional regression tests for a certain area of an application, the apparatus 102 may provide, via the test execution model 118, exposing of the capability of a pipeline defining the test execution model 118. Further, mapping between jobs and tests may be handled automatically (e.g., without human intervention), as part of the test execution model 118. A user may specify an execution request as a set of tests to be executed, and the apparatus 102 may identify pipeline steps to be executed, pass parameters to the identified pipeline steps, and execute the identified pipeline steps. Thus, for the user that is to execute a suite of functional regression tests for a certain area of an application, a full understanding of the pipeline flow and dependencies is not needed. Further, personnel, such as CI/CD administrators, may not need to re-implement and/or duplicate an existing pipeline.

According to an example, assuming that a user (e.g., a quality engineer) is to provision a new "staging like" environment, the user may bypass the need to understand pipeline details, and the apparatus 102 may provide, via the provisioning model 122, for pipeline implementation in the new environment.

According to an example, assuming a user (e.g., a CI/CD administrator) is to make a "validation pipeline" more strict during stabilization without changing pipeline implementation, the apparatus 102 may provide, via the validation model 126, an alternative flow (e.g., the alternative flow being defined in the validation model 126) in a controlled manner, where the flow may be changed whenever needed.

The modules and other elements of the apparatus 102 may be machine readable instructions stored on a non-transitory computer readable medium. In this regard, the apparatus 102 may include or be a non-transitory computer readable medium. In addition, or alternatively, the modules and other elements of the apparatus 102 may be hardware or a combination of machine readable instructions and hardware.

Figure 6:
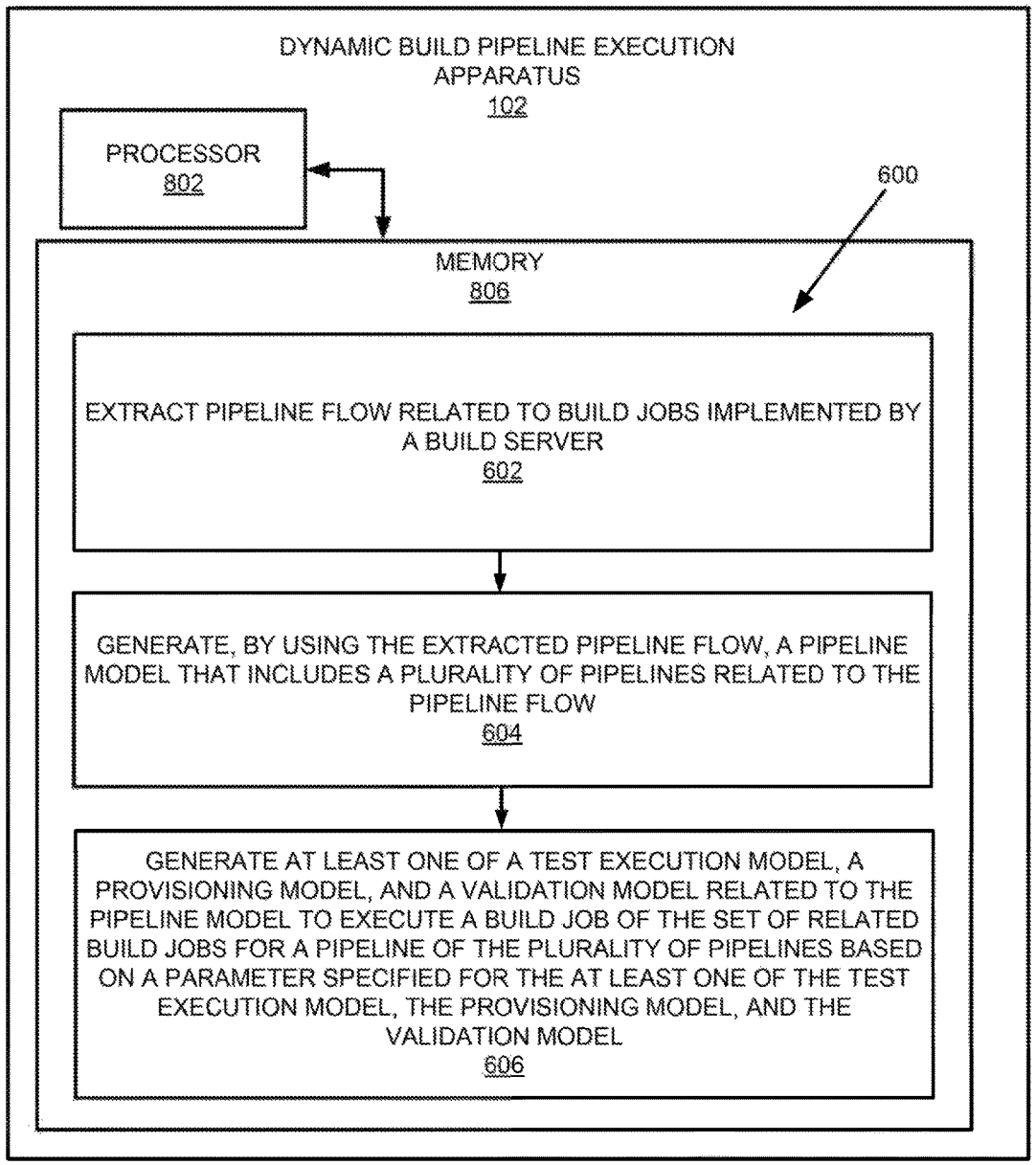
FIG. 6 illustrates a flowchart of the method for dynamic build pipeline execution, according to an example of the present disclosure.
Figure 7:
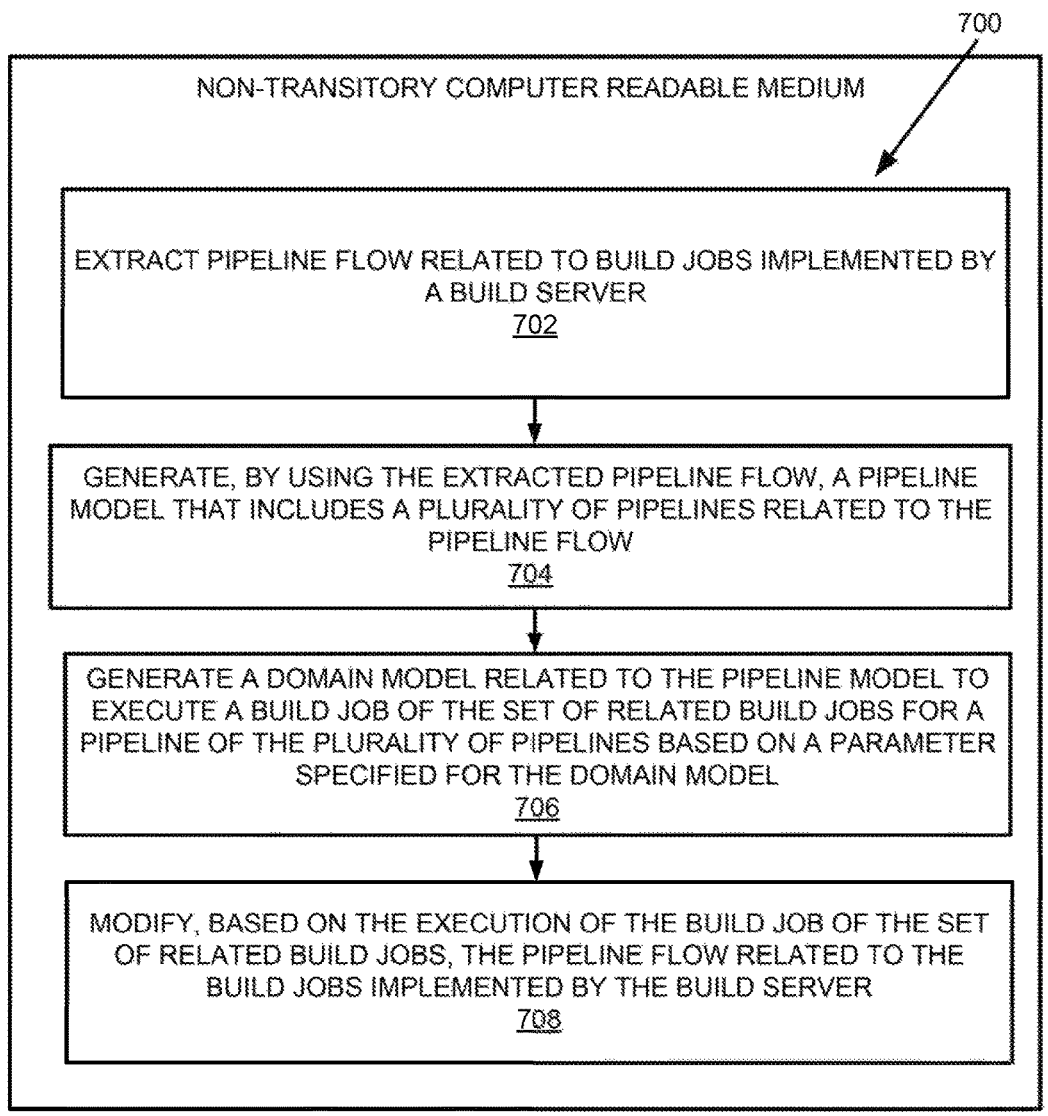
FIG. 7 illustrates a flowchart of the method for dynamic build pipeline execution, according to an example of the present disclosure.

FIGS. 5-7 respectively illustrate flowcharts of methods 500, 600, and 700 for dynamic build pipeline execution, corresponding to the example of the dynamic build pipeline execution apparatus 102 whose construction is described in detail above. The methods 500, 600, and 700 may be implemented on the dynamic build pipeline execution apparatus 102 with reference to FIGS. 1-4 by way of example and not limitation. The methods 500, 600, and 700 may be practiced in other apparatus.

Further, although execution of the methods described herein is with reference to the apparatus 102 of FIG. 1, other suitable devices for execution of these methods will be apparent to those of skill in the art. The methods described in the flowcharts of FIG. 5-7 may be implemented in the form of executable instructions stored on a machine-readable storage medium, such as the memory 806 and/or the secondary data storage 808 of FIG. 8, by one or more modules described herein, and/or in the form of electronic circuitry.

Referring to FIGS. 1-5, and particularly FIG. 5, for the method 500, at block 502, the method may include extracting (e.g., by using the build server plugin 106) a pipeline flow related to build jobs 108 that are used to implement a set of machine readable instructions (e.g., the build jobs 108 on the build server 104).

At block 504, the method may include generating, by using the extracted pipeline flow, a pipeline model 114 that includes a plurality of pipelines related to the pipeline flow. Each pipeline of the plurality of pipelines may represent a set of related build jobs (e.g., see pipeline-A and pipeline-B of FIG. 4) selected from the build jobs 108 that are used to implement the set of machine readable instructions, and include an entry point (e.g., see entry points for JobA1 and JobA3 for the example of FIG. 4) to access the set of related build jobs.

At block 506, the method may include generating a domain model (e.g., one of the domain models including the test execution model 118, the provisioning model 122, or the validation model 126) related to the pipeline model 114 to execute a build job of the set of related build jobs for a pipeline of the plurality of pipelines based on a parameter specified for the domain model.

According to examples, the domain model may include a test execution model 118 and the parameter specified for the domain model may include a test execution parameter. As disclosed herein with respect to the example of FIG. 4, the method 500 may include determining a test that is to be executed on the build job of the set of related build jobs, determining the pipeline of the plurality of pipelines that is related to the build job associated with the test, determining the entry point to the build job associated with the test, and performing, based on the test execution parameter, the test on the build job associated with the test by executing, via the entry point, the build job associated with the test.

According to examples, the method 500 may include performing, based on the test execution parameter and a test environment parameter, the test on the build job associated with the test by executing, via the entry point, the build job associated with the test.

According to examples, as disclosed herein with respect to the example of FIG. 4, the method 500 may include performing, based on the test execution parameter, the test on the build job associated with the test by executing, via the entry point, the build job associated with the test and any intermediate build jobs between the entry point and the build job associated with the test.

According to examples, the method 500 may include modifying, based on the performance of the test, the pipeline flow related to the build jobs 108 that are used to implement the set of machine readable instructions.

According to examples, the domain model may include a provisioning model 122. As disclosed herein with respect to the example of FIG. 4, the method 500 may include determining a provisioning environment for analysis of the build job of the set of related build jobs, determining the pipeline of the plurality of pipelines that is related to the build job associated with the provisioning environment, determining the entry point to the build job associated with the provisioning environment, and executing, via the entry point, the build job associated with the provisioning environment in the provisioning environment.

According to examples, for the method 500, as disclosed herein with reference to the example of FIG. 4, the provisioning environment may include a development environment, a quality assurance environment, or a production environment associated with the build job.

According to examples, the method 500 may include modifying (e.g., by using the build server plugin 106), based on the execution of the build job associated with the provisioning environment, the pipeline flow related to the build jobs 108 that are used to implement the set of machine readable instructions.

According to examples, the domain model may include a validation model 126. As disclosed herein with reference to the example of FIG. 4, the method 500 may include determining a validation specification for analysis of the build job of the set of related build jobs, determining the pipeline of the plurality of pipelines that is related to the build job associated with the validation specification, determining the entry point to the build job associated with the validation specification, and executing, via the entry point, the build job associated with the validation specification to determine whether machine readable instructions of the build job associated with the validation specification meet the validation specification.

According to examples, in response to a determination that the machine readable instructions of the build job associated with the validation specification do not meet the validation specification, the method 500 may include modifying (e.g., by using the build server plugin 106), based on the execution of the build job associated with the validation specification, the pipeline flow related to the build jobs 108 that are used to implement the set of machine readable instructions.

Referring to FIGS. 1-4 and 6, and particularly FIG. 6, for the method 600, at block 602, the method may include extracting a pipeline flow related to build jobs 108 implemented by a build server 104.

At block 604, the method may include generating, by using the extracted pipeline flow, a pipeline model 114 that includes a plurality of pipelines related to the pipeline flow. Each pipeline of the plurality of pipelines may represent a set of related build jobs selected from the build jobs 108 implemented by the build server 104, and include an entry point to access the set of related build jobs.

At block 606, the method may include generating a test execution model 118, a provisioning model 122, and/or a validation model 126 related to the pipeline model 114 to execute a build job of the set of related build jobs for a pipeline of the plurality of pipelines based on a parameter specified for the test execution model 118, the provisioning model 122, and/or the validation model 126.

According to examples, the method 600 may include modifying, based on the execution of the build job of the set of related build jobs, the pipeline flow related to the build jobs 108 implemented by the build server 104.

According to examples, modifying, based on the execution of the build job of the set of related build jobs, the pipeline flow related to the build jobs 108 implemented by the build server 104, may include modifying a build queue of the build server 104 by removing a build job from the build queue.

Referring to FIGS. 1-4 and 7, and particularly FIG. 7, for the method 700, at block 702, the method may include extracting a pipeline flow related to build jobs 108 implemented by a build server 104.

At block 704, the method may include generating, by using the extracted pipeline flow, a pipeline model 114 that includes a plurality of pipelines related to the pipeline flow. Each pipeline of the plurality of pipelines may represent a set of related build jobs selected from the build jobs 108 implemented by the build server 104, and include an entry point to access the set of related build jobs.

At block 706, the method may include generating a domain model related to the pipeline model 114 to execute a build job of the set of related build jobs for a pipeline of the plurality of pipelines based on a parameter specified for the domain model.

At block 708, the method may include modifying, based on the execution of the build job of the set of related build jobs, the pipeline flow related to the build jobs 108 implemented by the build server 104.

According to examples, the domain model related to the pipeline model 114 may include a test execution model 118, a provisioning model 122, or a validation model 126 related to the pipeline model 114, and the method 700 may include executing the build job of the set of related build jobs for the pipeline of the plurality of pipelines based on the parameter specified for the corresponding test execution model 118, the provisioning model 122, or the validation model 126.

Figure 8:
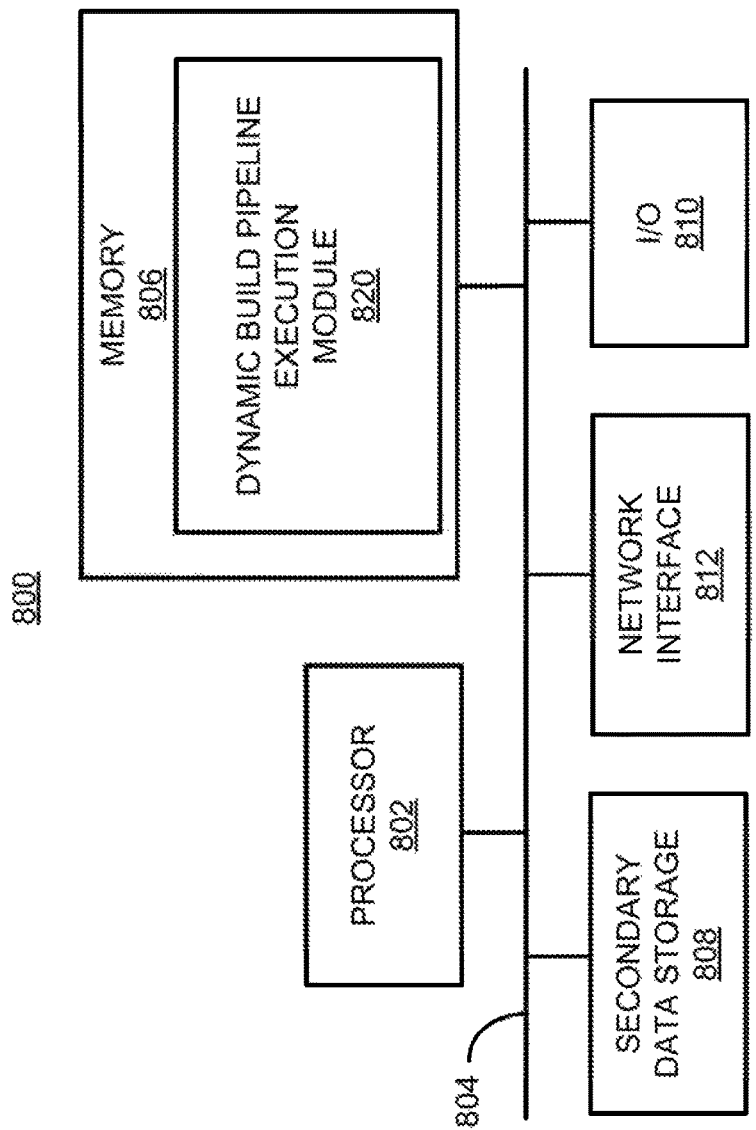
FIG. 8 illustrates a computer system, according to an example of the present disclosure.

FIG. 8 shows a computer system 800 that may be used with the examples described herein. The computer system 800 may represent a generic platform that includes components that may be in a server or another computer system.

The computer system 800 may be used as a platform for the apparatus 102. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a dynamic build pipeline execution module 820 including machine readable instructions residing in the memory 806 during runtime and executed by the processor 802. The dynamic build pipeline execution module 820 may include the modules of the apparatus 102 shown in FIG. 1.

The computer system 800 may include an I/O device 810, such as a keyboard, a mouse, a display, etc. The computer system may include a network interface 812 for connecting to a network. Other known electronic components may be added or substituted in the computer system.

The foregoing disclosure describes a number of examples for dynamic build pipeline execution. The disclosed examples may include systems, devices, computer-readable storage media, and methods for dynamic build pipeline execution. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for dynamic build pipeline execution, the method comprising:
extracting, by a hardware processor of a computing device, structural information of a pipeline flow of build jobs on a build server, wherein the build jobs in the pipeline flow are connected in series and executed on the build server to implement a set of machine readable instructions;

generating, by the hardware processor, a plurality of custom pipelines based on the structural information of the pipeline flow extracted from the build server, wherein the plurality of custom pipelines include different subsets of related build jobs selected from the build jobs to fulfill different user requests;

identifying an entry point to access each of the subsets of related build jobs of the custom pipelines; and generating a domain model, including a testing execution model, a provisioning model, or a validation model, from the pipeline model to execute a particular build job in one of the subsets of related build jobs for one of the plurality of custom pipelines based on a parameter specified for the domain model; and executing, by the hardware processor, the domain model in response to a user request, via the entry point of one of the subsets of related build jobs to simulate a test, provisioning, or validation of the pipeline flow executed on the build server.

2. The method according to claim 1, wherein the domain model includes the test execution model and the parameter specified for the domain model includes a test execution parameter, the method further comprising:

determining a test that is to be executed on the particular build job of the subset of related build jobs;

determining the custom pipeline of the plurality of custom pipelines that is related to the particular build job associated with the test;

determining the entry point to the particular build job associated with the test; and performing, based on the test execution parameter, the test on the particular build job associated with the test by executing, via the entry point, the particular build job associated with the test.

3. The method according to claim 2, wherein performing, based on the test execution parameter, the test on the particular build job associated with the test by executing, via the entry point, the particular build job associated with the test, further comprises:

performing, based on the test execution parameter and a test environment parameter, the test on the particular build job associated with the test by executing, via the entry point, the particular build job associated with the test.

4. The method according to claim 2, wherein performing, based on the test execution parameter, the test on the particular build job associated with the test by executing, via the entry point, the particular build job associated with the test, further comprises:

performing, based on the test execution parameter, the test on the particular build job associated with the test by executing, via the entry point, the particular build job associated with the test and any intermediate build jobs between the entry point and the particular build job associated with the test.

5. The method according to claim 2, further comprising:
modifying, based on the performance of the test, the pipeline flow related to of the build jobs on the build server.

6. The method according to claim 1, wherein the domain model includes the provisioning model, the method further comprising:

determining a provisioning environment for analysis of the particular build job of the subset of related build jobs;

determining the custom pipeline of the plurality of custom pipelines that is related to the particular build job associated with the provisioning environment;

determining the entry point to the particular build job associated with the provisioning environment; and executing, via the entry point, the particular build job associated with the provisioning environment in the provisioning environment.

7. The method according to claim 6, wherein the provisioning environment includes a development environment, a quality assurance environment, or a production environment associated with the particular build job.

8. The method according to claim 6, further comprising:
modifying, based on the execution of the particular build job associated with the provisioning environment, the pipeline flow of the build jobs on the build server.

9. The method according to claim 1, wherein the domain model includes the validation model, the method further comprising:

determining a validation specification for analysis of the particular build job of the subset of related build jobs;

determining the custom pipeline of the plurality of custom pipelines that is related to the particular build job associated with the validation specification;

determining the entry point to the particular build job associated with the validation specification; and executing, via the entry point, the particular build job associated with the validation specification to determine whether machine readable instructions of the particular build job associated with the validation specification meet the validation specification.

10. The method according to claim 9, further comprising:
in response to a determination that the machine readable instructions of the particular build job associated with the validation specification do not meet the validation specification, modifying, based on the execution of the particular build job associated with the validation specification, the pipeline flow of the build jobs on the build server.

11. A dynamic build pipeline execution apparatus comprising:
a processor; and
a memory storing machine readable instructions that when executed by the processor cause the processor to:
extract, from a build server, structural information of a pipeline flow of build jobs implemented on the build server, wherein the build jobs in the pipeline flow are connected in series and executed on the build server to implement a set of instructions;

generate a plurality of custom pipelines based on the structural information of the pipeline flow extracted from the build server, wherein the plurality of custom pipelines include different subsets of related build jobs selected from the build jobs to fulfill different user requests;

identify an entry point to access each of the subsets of related build jobs of the custom pipelines;

generate at least one of a test execution model, a provisioning model, and a validation model related to the pipeline model to execute a particular build job in one of the subsets of related build jobs for one of the plurality of custom pipelines based on a parameter specified for the at least one of the test execution model, the provisioning model, and the validation model; and execute the at least one of the test execution model, the provisioning model, and the validation model in response to a user request, via the entry point of one of the subsets of related build jobs to simulate a test, provisioning, or validation of the pipeline flow executed on the build server.

12. The dynamic build pipeline execution apparatus according to claim 11, further comprising machine readable instructions that when executed by the processor further cause the processor to:

modify, based on the execution of the particular build job of the subset of related build jobs, the pipeline flow of the build jobs on the build server.

13. The dynamic build pipeline execution apparatus according to claim 12, wherein the machine readable instructions to modify, based on the execution of the particular build job of the subset of related build jobs, the pipeline flow of the build jobs on the build server, further comprise machine readable instructions that when executed by the processor further cause the processor to:

modify a build queue on the build server by removing a build job from the build queue.

14. A non-transitory computer readable medium having stored thereon machine readable instructions to provide dynamic build pipeline execution, the machine readable instructions, when executed, cause a processor to:

extract, from a build server, structural information of a pipeline flow of build jobs implemented on the build server wherein the build jobs in the pipeline flow are connected in series and executed on the build server to implement a set of instructions;

generate, by using the structural information of the pipeline flow extracted from the build server, a plurality of custom pipelines related to the pipeline flow, wherein the plurality of custom pipelines include different subsets of related build jobs selected from the build jobs implemented on the build server;

identify an entry point to access each of the subsets of related build jobs of the custom pipelines;

generate a domain model, including a test execution model, a provisioning model, or a validation model, related to the pipeline model to execute a particular build job in one of the subsets of related build jobs for one of the plurality of custom pipelines based on a parameter specified for the domain model; and modify, based on the execution of the particular build job in one of the subset of related build jobs, the pipeline flow of the build jobs on the build server.

15. The non-transitory computer readable medium according to claim 14, wherein the machine readable instructions, when executed, further cause the processor to:

execute the particular build job in one of the subsets of related build jobs for one of the plurality of custom pipelines based on the parameter specified for the test execution model, the provisioning model, or the validation model to simulate a test, provisioning, or validation of the pipeline flow executed on the build server.

* * * * *